United States Patent
Averbuch et al.

(10) Patent No.: US 11,691,646 B2
(45) Date of Patent: Jul. 4, 2023

(54) METHOD AND APPARATUS FOR GENERATING A FLOOD EVENT WARNING FOR A FLOOD PRONE LOCATION

(71) Applicant: HERE Global B.V., Eindhoven (NL)

(72) Inventors: Alex Averbuch, Buffalo Grove, IL (US); Kun Lee, Lisle, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 123 days.

(21) Appl. No.: 16/802,039

(22) Filed: Feb. 26, 2020

(65) Prior Publication Data
US 2021/0261165 A1    Aug. 26, 2021

(51) Int. Cl.
| | | |
|---|---|---|
| *B60W 60/00* | (2020.01) | |
| *B60W 40/06* | (2012.01) | |
| *B60W 50/14* | (2020.01) | |
| *G05D 1/02* | (2020.01) | |
| *G07C 5/00* | (2006.01) | |
| *H04W 4/90* | (2018.01) | |
| *G01C 21/34* | (2006.01) | |
| *G06V 20/56* | (2022.01) | |

(52) U.S. Cl.
CPC ...... *B60W 60/00182* (2020.02); *B60W 40/06* (2013.01); *B60W 50/14* (2013.01); *G01C 21/3461* (2013.01); *G05D 1/0214* (2013.01); *G06V 20/56* (2022.01); *G07C 5/008* (2013.01); *H04W 4/90* (2018.02); *B60W 2050/146* (2013.01); *B60W 2555/20* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 2011/0043377 | A1* | 2/2011 | McGrath | G08G 1/096775 340/905 |
| 2014/0278561 | A1* | 9/2014 | Knuffke | G06Q 40/08 705/4 |
| 2014/0280659 | A1 | 9/2014 | Siram et al. | |

(Continued)

OTHER PUBLICATIONS

Witherow, M. A. et al., *Floodwater Detection on Roadways from Crowdsourced Images*, Computer Methods in Biomechanics and Biomedical Engineering: Imaging & Visualization (Jun. 26, 2018) 26 pages.

(Continued)

*Primary Examiner* — James J Lee
*Assistant Examiner* — Steven Vu Nguyen
(74) *Attorney, Agent, or Firm* — Alston & Bird LLP

(57) ABSTRACT

A method, apparatus and computer program product for activating a flood event warning are described herein. In the context of a method, a location may be identified as a flood prone location. Data relating to the flood prone location may be received from one or more remote devices. The method may determine a flood confidence for the flood prone location based upon the data. The method may identify an active flood event for the flood prone location based on the flood confidence and cause a flood event warning to be activated in an instance in which the active flood event is identified.

21 Claims, 5 Drawing Sheets

(56) References Cited

U.S. PATENT DOCUMENTS

| | | |
|---|---|---|
| 2014/0350970 A1 | 11/2014 | Schumann, Jr. et al. |
| 2015/0204682 A1 | 7/2015 | Dutta Choudhury et al. |
| 2018/0312165 A1 | 11/2018 | Ar |
| 2019/0080200 A1* | 3/2019 | Mishra ................. G06K 9/6256 |
| 2019/0197886 A1* | 6/2019 | Kanehara ............. G05D 1/0088 |
| 2020/0189463 A1* | 6/2020 | Kunz ...................... G01S 17/89 |
| 2020/0191591 A1* | 6/2020 | Zhang ................. G01C 21/3859 |
| 2021/0063178 A1* | 3/2021 | Modi .................... B60W 50/14 |

OTHER PUBLICATIONS

Vizzion: Traffic Camera Data and Services [online] [retrieved Mar. 27, 2020]. Retrieved via the Internet: https://web.archive.org/web/20190906084259/http://vizzion.com/ (dated Sep. 6, 2019) 1 page.
HERE Hazard Warnings, HERE (2017) 2 pages.

* cited by examiner

METHOD AND APPARATUS FOR GENERATING A FLOOD EVENT WARNING FOR A FLOOD PRONE LOCATION

TECHNOLOGICAL FIELD

Example embodiments relate generally to a method, apparatus and computer program product for identifying an active flood event for a flood prone location and, in response, activating a flood event warning.

BACKGROUND

Some locations along a road network are prone to flooding in response to heavy and/or prolonged rainfall. In some instances, drivers may enter the flooded location without any advance warning and, as a result, may be subjected to dangerous driving conditions. In other instances, a driver may receive a warning of a flooded roadway, but not until the driver has driven to the flooded location with the warning being provided by a sign and/or a person who is redirecting traffic. By only providing a warning and redirecting a driver in these instances once a driver has reached a flooded location, the amount of time required navigate around the flooded roadway is increased by having to drive to the flooded location prior to retracing its path of travel to reach the detour.

Users may utilize maps providing traffic information, weather information, road event alerts and/or combinations thereof for a wide variety of purposes including navigation. However, these maps generally do not provide any warnings of a flooded roadway and, instead, may actually define a route that directs a driver to and through a flooded roadway.

BRIEF SUMMARY

A method, apparatus and computer program product are provided for identifying an active flood event for a flood prone location and, in response, activating a flood event warning for the flood prone location. By providing the flood event warning, a driver may receive advance notice of flood event and, as a result, may be re-routed around the flood prone location without having to drive to flood prone location. Thus, a driver may more efficiently navigate around a flooded roadway and may more readily avoid potential safety issues associated with driving through a flooded location.

In an example embodiment, a method is provided for generating a flood event warning for a flood prone location. The method comprises identifying a flood prone location. Identifying the flood prone location may comprise designating a location stored in a database as the flood prone location. The method also comprises receiving data relating to the flood prone location from one or more remote devices. The data may comprise images received from image capturing apparatus(es) of the one or more remote devices, such as one or more vehicles. The method may comprise triggering the one or more image capturing apparatus(es) to capture images of the flood prone location when the one or more remote devices are within a specified range of the flood prone location. The method further comprises determining a flood confidence for the flood prone location based upon the data. Determining the flood confidence may comprise determining a ratio of a number of images of the flood prone location that are identified to represent flooding at the flood prone location to a total number of images of the flood prone location. The method additionally comprises identifying an active flood event for the flood prone location based upon the flood confidence. Identifying the active flood event may comprise analyzing the images pursuant to an automatic image analysis technique. The method comprises causing a flood event warning to be activated in an instance in which the active flood event is identified. Activating the flood event warning may comprise causing the flood event warning to be transmitted to the one or more remote devices for presentation in conjunction with a mapping or navigation system. Additionally or alternatively, activating the flood event warning may comprise causing a control signal to be transmitted to the one or more vehicles in order to deactivate autonomous driving of the one or more vehicles.

In another example embodiment, an apparatus may be configured to generate a flood event warning for a flood prone location. The apparatus may comprise processing circuitry and at least one memory including computer program code instructions with the computer program code instructions configured to, when executed by the processing circuitry, cause the apparatus to identify a flood prone location. Identifying the flood prone location may comprise designating a location stored in a database as the flood prone location. The computer program code instructions are also configured to cause the apparatus to receive data relating to the flood prone location from one or more remote devices. The data may comprise images received from image capturing apparatus(es) of the one or more remote devices, such as one or more vehicles. The computer program code instructions may be configured to cause the apparatus to trigger the one or more image capturing apparatus(es) to capture images of the flood prone location when the one or more remote devices are within a specified range of the flood prone location. The computer program code instructions are further configured to cause the apparatus to determine a flood confidence for the flood prone location based upon the data. Determining the flood confidence may comprise determining a ratio of a number of images of the flood prone location that are identified to represent flooding at the flood prone location to a total number of images of the flood prone location. The computer program code instructions are additionally configured to cause the apparatus to identify an active flood event for the flood prone location based upon the flood confidence. Identifying the active flood event may comprise analyzing the images pursuant to an automatic image analysis technique. The computer program code instructions are configured to cause the apparatus to activate a flood event warning in an instance in which the active flood event is identified. Activating the flood event warning may comprise causing the flood event warning to be transmitted to the one or more remote devices for presentation in conjunction with a mapping or navigation system. Additionally or alternatively, activating the flood event warning may comprise causing a control signal to be transmitted to the one or more vehicles in order to deactivate autonomous driving of the one or more vehicles.

In a further example embodiment, a computer program product may be configured to generate a flood event warning for a flood prone location. The computer program product may comprise at least one non-transitory computer readable storage medium having computer-executable program code instructions stored therein with the computer-executable program code instructions including program code instructions configured, upon execution, to identify a flood prone location. Identifying the flood prone location may comprise designating a location stored in a database as the flood prone location. The program code instructions are also configured, upon execution, to receive data relating to the flood prone location from one or more remote devices. The data may comprise images received from image capturing apparatus(es) of the one or more remote devices, such as one or more vehicles. The program code instructions may be configured, upon execution, to trigger the one or more image capturing apparatus(es) to capture images of the flood prone location when the one or more remote devices are within a specified range of the flood prone location. The program code instructions are further configured, upon execution, to determine a flood confidence for the flood prone location based upon the data. Determining the flood confidence may comprise determining a ratio of a number of images of the flood prone location that are identified to represent flooding at the flood prone location to a total number of images of the flood prone location. The program code instructions are additionally configured, upon execution, to identify an active flood event for the flood prone location based upon the flood confidence. Identifying the active flood event may comprise analyzing the images pursuant to an automatic image analysis technique. The program code instructions are configured, upon execution, to cause a flood event warning to be activated in an instance in which the active flood event is identified. Activating the flood event warning may comprise causing the flood event warning to be transmitted to the one or more remote devices for presentation in conjunction with a mapping or navigation system. Additionally or alternatively, activating the flood event warning may comprise causing a control signal to be transmitted to the one or more vehicles in order to deactivate autonomous driving of the one or more vehicles.

In yet another example embodiment, an apparatus is provided for generating a flood event warning for a flood prone location. The apparatus comprises means for identifying a flood prone location. The means for identifying the flood prone location may comprise means for designating a location stored in a database as the flood prone location. The apparatus also comprises means for receiving data relating to the flood prone location from one or more remote devices. The data may comprise images received from image capturing apparatus(es) of the one or more remote devices, such as one or more vehicles. The apparatus may comprise means for triggering the one or more image capturing apparatus(es) to capture images of the flood prone location when the one or more remote devices are within a specified range of the flood prone location. The apparatus further comprises means for determining a flood confidence for the flood prone location based upon the data. The means for determining the flood confidence may comprise means for determining a ratio of a number of images of the flood prone location that are identified to represent flooding at the flood prone location to a total number of images of the flood prone location. The apparatus additionally comprises means for identifying an active flood event for the flood prone location based upon the flood confidence. The means for identifying the active flood event may comprise means for analyzing the images pursuant to an automatic image analysis technique. The apparatus comprises means for causing a flood event warning to be activated in an instance in which the active flood event is identified. The means for activating the flood event warning may comprise means for causing the flood event warning to be transmitted to the one or more remote devices for presentation in conjunction with a mapping or navigation system. Additionally or alternatively, the means for activating the flood event warning may comprise means for causing a control signal to be transmitted to the one or more vehicles in order to deactivate autonomous driving of the one or more vehicles.

BRIEF DESCRIPTION OF THE DRAWINGS

Figure 1:
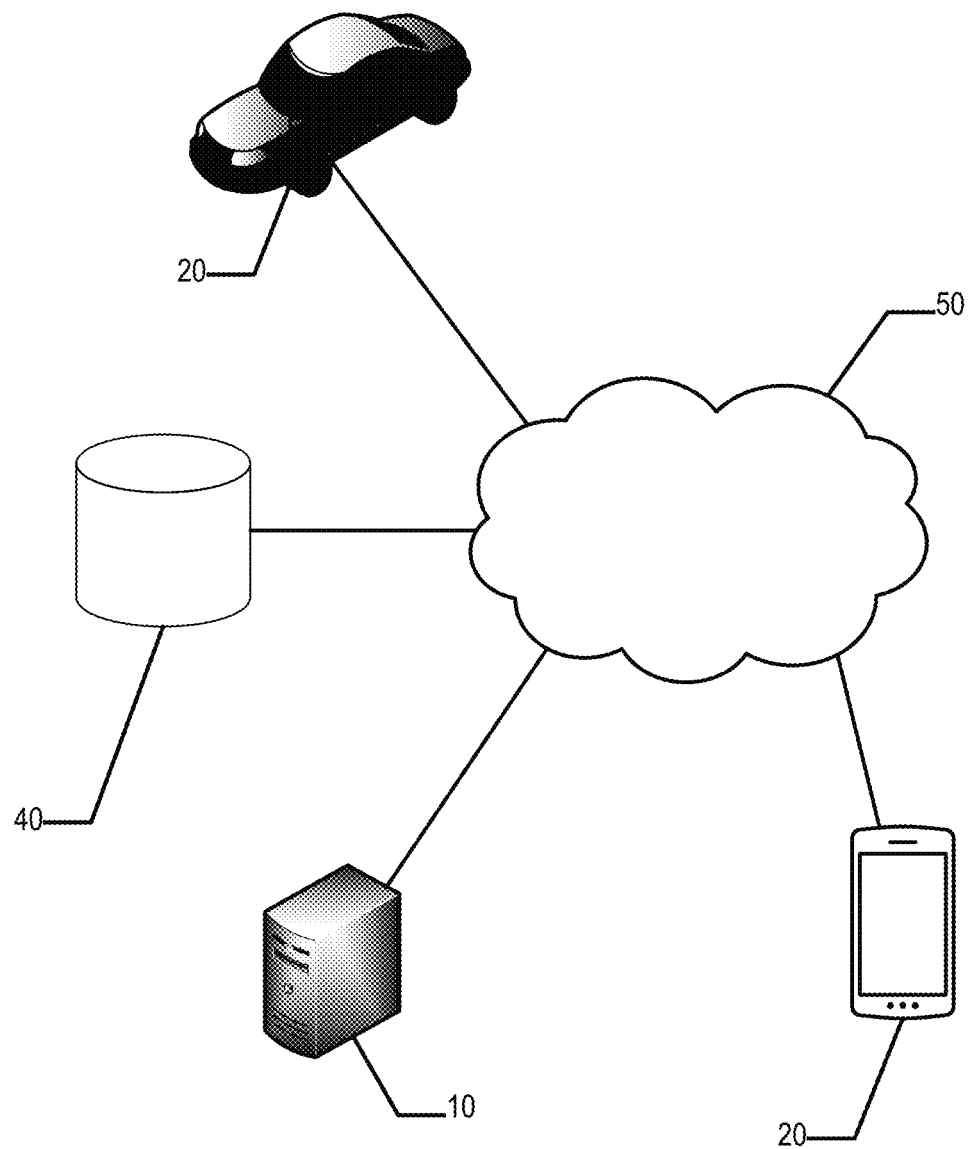
Figure 2A:
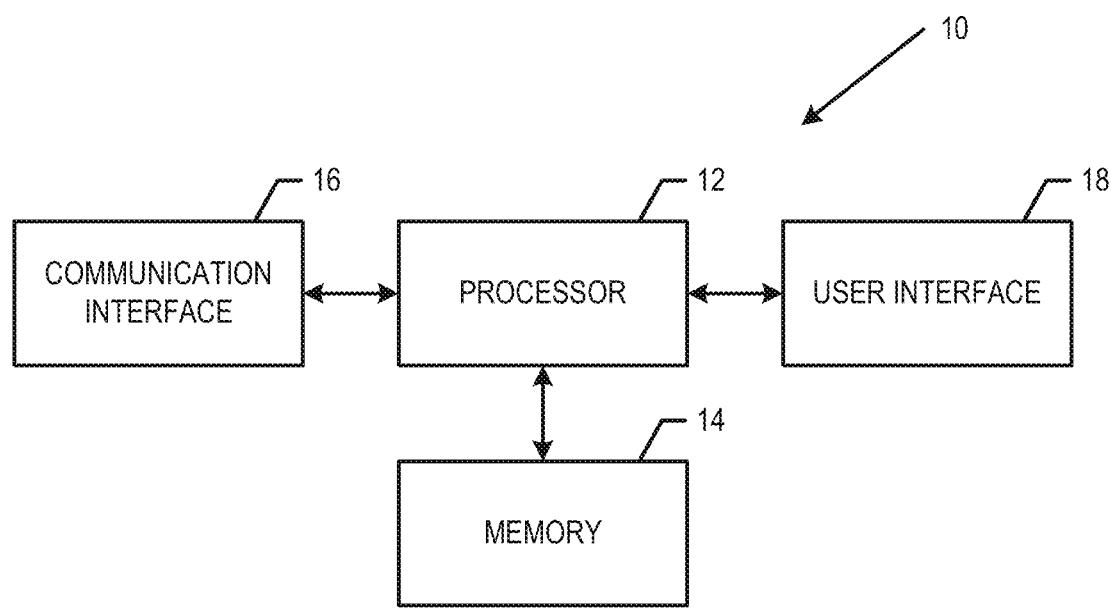
Figure 2B:
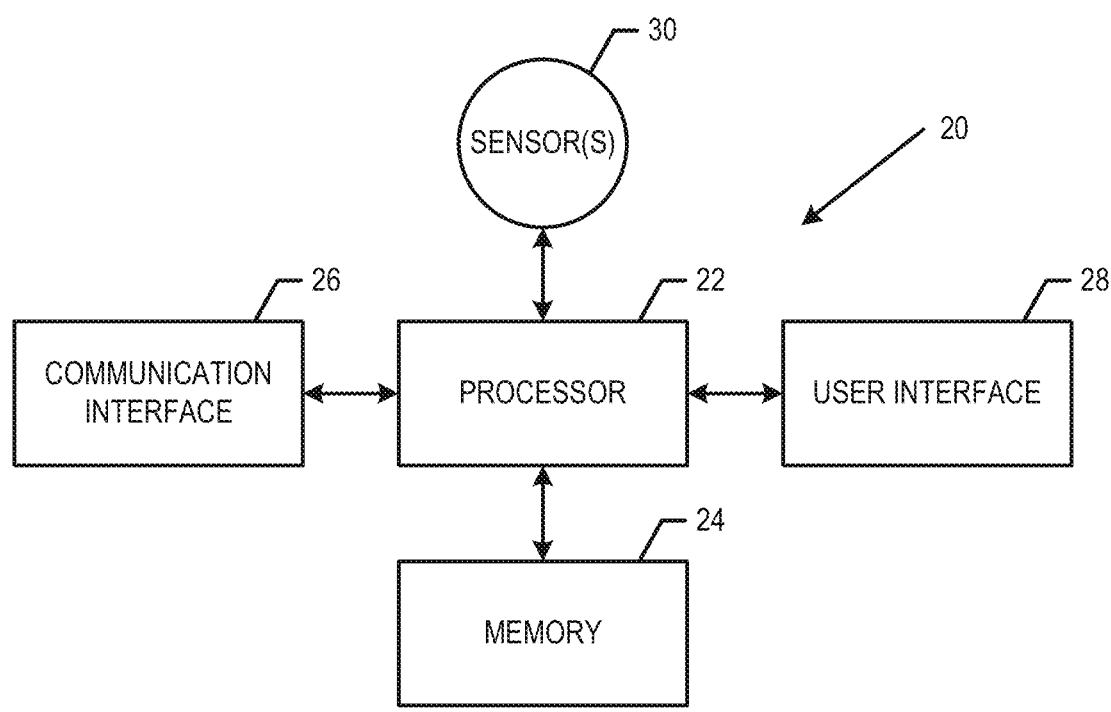
Figure 3:
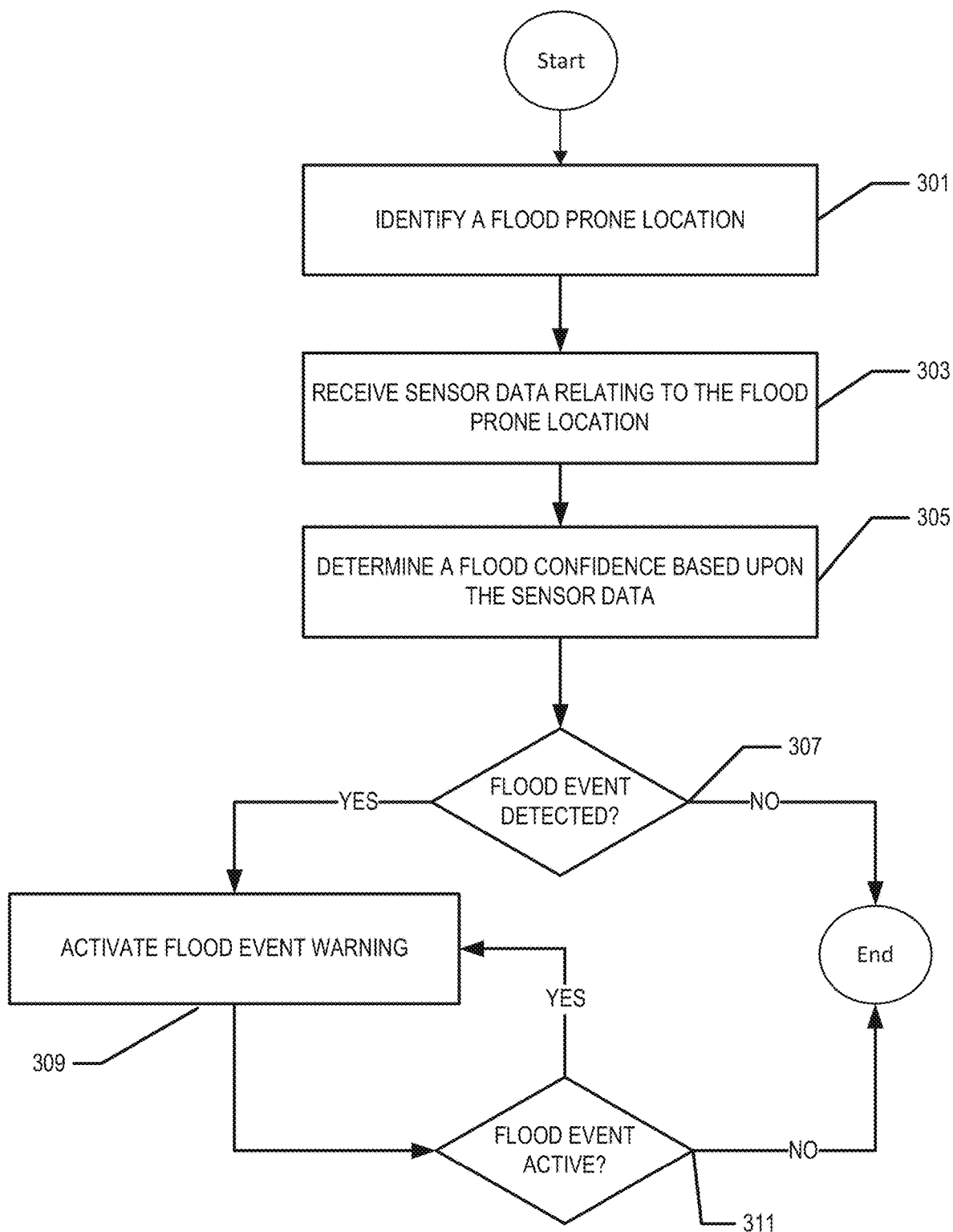
Figure 4:
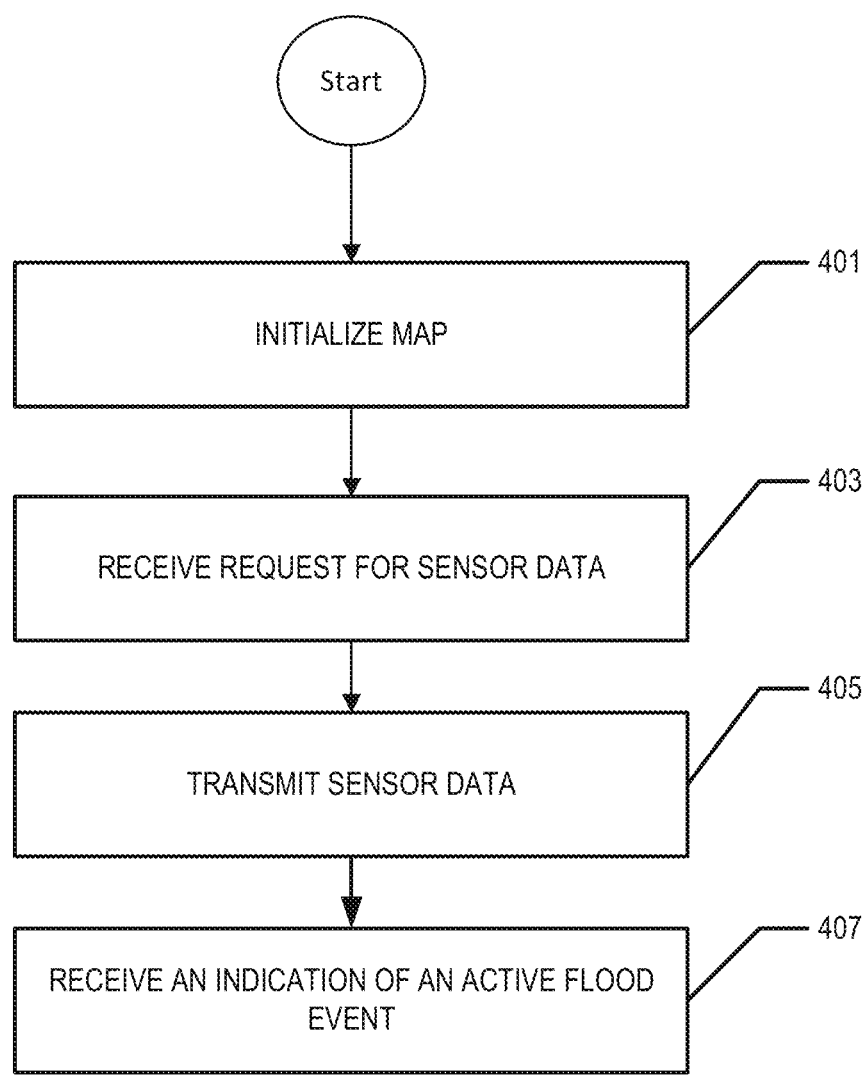

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a computing entity that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the computing entity of FIG. 2A, in accordance with an example embodiment; and FIG. 4 is a flowchart illustrating operations performed, such as by the vehicle apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

A method, apparatus and computer program product for activating a flood event warning for a flood prone location are described herein. Though many of the embodiments are described in the context of activating a flood event warning, the method, apparatus and computer program product may be utilized to generate event warnings for other road conditions such as flood, heavy rain, fog, visibility, slippery roads, accidents, broken-down vehicles and the like.

FIG. 1 provides an illustration of an example system that can be used in conjunction with various embodiments of the present invention. As shown in FIG. 1, the system may include one or more vehicle apparatuses 20, one or more computing entities 10 (e.g., servers), one or more networks 50, and/or the like. In various embodiments, the vehicle apparatus 20 may be an in vehicle navigation system, vehicle control system, a mobile computing device, and/or the like. For example, a vehicle apparatus 20 may be an in vehicle navigation system mounted within and/or on-board a vehicle such as a motor vehicle, non-motor vehicle, automobile, car, scooter, truck, van, bus, motorcycle, bicycle, Segway, golf cart, and/or the like. In other embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle, assist in control of a vehicle, and/or the like. In some embodiments, the vehicle apparatus 20 may be or comprise one or more image capturing apparatuses configured to capture images of the vehicle's surroundings. In other embodiments, the image capturing apparatuses may be distinct from the vehicle apparatus 20, but configured to capture images of the environment about the vehicle apparatus.

In example embodiments, a computing entity 10 may be in communication with the vehicle apparatus 20 and may comprise components similar to those shown in FIG. 2A, while the vehicle apparatus 20 may comprise components similar to those shown in FIG. 2B. In various embodiments, the computing entity 10 may be located remotely from the vehicle apparatus 20, while in other embodiments, the computing entity and the vehicle apparatus may be collocated, such as within a vehicle. Each of the components of the system, including one or more vehicle apparatus and one or more computing entities, may be in communication with one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 may be in communication with a computing entity 10 via the network 50 and/or via the Cloud.

As shown in FIG. 2A, the computing entity 10 may comprise a processor 12, memory 14, and optionally a user interface 18, a communications interface 16, and/or other components configured to perform various operations, procedures, functions or the like described herein. Similarly, as shown in FIG. 2B, the vehicle apparatus 20 may comprise a processor 22, memory 24, a communications interface 26, a user interface 28, one or more sensors 30 (e.g., a location sensor such as a global positioning system (GPS) sensor; camera(s); two dimensional (2D) and/or three dimensional (3D) light detection and ranging (LiDAR) sensor(s); long, medium, and/or short range radio detection and ranging (RADAR) sensor(s); ultrasonic sensors; electromagnetic sensors; (near-) infrared (IR) cameras, 3D cameras, 360° cameras, accelerometer(s), gyroscope(s), and/or other sensors that enable the vehicle apparatus to determine one or more features of the corresponding vehicle's surroundings), and/or other components configured to perform various operations, procedures, functions or the like described herein. Similarly, Example embodiments of the vehicle apparatus 20 and the computing entity 10 are described in more detail below with respect to FIGS. 2A and 2B.

II. Example Operation

In example embodiments, the computing entity 10 may activate a flood event warning for a flood prone location. For example, the computing entity 10 may identify a location stored in a database as a flood prone location. Identifying the flood prone location may comprise designating a location as the flood prone location. The computing entity 10 may receive or request data from one or more remote devices (e.g., vehicle apparatuses 20) within a specified range of the flood prone location. The vehicle apparatus 20 may receive such requests for data and if the vehicle apparatus 20 is within the specified range of the flood prone location, one or more sensors 30 associated with and/or in communication with the vehicle apparatus 20 may gather, capture, record, and/or measure sensor information/data. The computing entity 10 may receive and store the data gathered by the vehicle apparatus 20 in the database and analyze the data to identify an active flood event for the flood prone location. In some embodiments, the computing entity 10 may offload at least some of the analysis by causing the vehicle apparatus 20 to analyze at least a portion of the sensor information/data and to cause a result of the analysis of the sensor information/data to be transmitted from the vehicle apparatus 20 to the computing entity 10. The computing entity 10 may receive and analyze a plurality of responses from a plurality of vehicle apparatuses 20, each comprising sensor information and/or data corresponding to the particular vehicle. In various embodiments, the computing entity 10 may perform the analyses and determine that the data indicates an active flood event. In some embodiments, portions of the analyses may be performed by the vehicle apparatuses 20. The computing entity 10 may transmit one or more signals or messages based on the plurality of responses and/or the analyses. For example, a flood event warning may be transmitted over the network 50 to one or more vehicle apparatuses 20 in communication with the computing entity 10. The flood event warning may be transmitted to one or more remote devices/vehicle apparatuses 20 for presentation, e.g., display, in conjunction with a mapping or navigation system. In various embodiments, the computing entity 10 may terminate the flood event warning after a specified amount of time has elapsed or may repeat the analysis periodically to determine whether to terminate or maintain the flood event warning. Activating or terminating a flood event warning may comprise transmitting computer-executable instructions to the vehicle apparatus(es) 20 or the like.

Identifying a Flood Prone Location

FIG. 3 provides a flowchart of operations performed by the computing entity 10 to activate a flood event warning, according to example embodiments.

Starting at block 301, the computing entity 10 includes means, such as the processor 12, for identifying a location stored in the database as a flood prone location. The flood prone location may be or comprise an area that is deemed susceptible to flooding, such as a low lying area where the water film depth of the road surface repeatedly surpasses a certain threshold, such as in response to a heavy rainfall. The location may be or comprise one or more points, lines (e.g., roads) or regions (e.g., polygons) corresponding with a geographical location on a map. An example polygon may comprise multiple roads within a portion of the map. An example point, line or region may be identified by a set of numbers corresponding to latitude and longitude as illustrated in Table 1 below.

TABLE 1

| Location | Location description | Location specification | Flood prone location | Date created |
| --- | --- | --- | --- | --- |
| 2100 Ashland | Point | POINT (30, 10) | No | Jun. 15, 2017 |
| Ashland and 16$^{th}$ street | Line | LINESTRING (30 10, 10 30, 40 40) | Yes | Jul. 20, 2017 |
| Highway 141 | Polygon | POLYGON ((30 10, 40 40, 20 40, 10 20, 30 10)) | No | Jun. 15, 2015 |

As shown, an example point may be identified by longitude and latitude, whereas a line may be identified by a line string indicating a start point, one or more mid-points and an end point and a polygon may be identified by a plurality of sets of points, starting and ending with the same point. The flood prone location may be predetermined using historic flooding data/maps, weather data/maps, or combinations thereof. The designation of a flood prone location may be based on information received/aggregated from a plurality of sources such as weather maps, real-time news articles corresponding with the location and/or historical flooding maps. In some embodiments, the computing entity 10 may be configured to identify a flood prone location based at least in part on sensor data received from one or more vehicle apparatuses 20. The computing entity 10 may be configured to identify a location as a flood prone location for a predetermined period of time or the designation may be modified in real-time or periodically based on up-to-date information. Regardless of the manner in which the flood prone location is identified, the computing entity 10 may be configured to identify the flood prone location as a hotspot location as shown in Table 1.

At block 303, upon identifying a flood prone location, the computing entity 10 may include means, such as the processor 12, the communication interface 16 or the like, for requesting sensor data/location data from one or more remote devices or computing entities (e.g. vehicle apparatuses 20) within a specified range of the flood prone location. The computing entity 10 of an example embodiment is configured to request sensor data (e.g. location data and/or images) from the one or more vehicle apparatuses 20. For example, the computing entity 10 may comprise means, such as processor 12, the communication interface 16 and/or the like, for instructing the vehicle apparatus 20 to provide sensor data, such as sensor data from locations within the specified range of the flood prone location. Along with the sensor data, location data may be provided indicating the location of the vehicle apparatus 20 at the time at which the sensor data was collected. Upon receipt of the sensor data and associated location data, the computing entity 10 may comprise means, such as processor 12 and/or the like, for determining, e.g., confirming, whether the received location data corresponds with a flood prone location stored in the database. The computing entity 10, such as the processor 12, may be configured to determine whether the location of the vehicle/vehicle apparatus 20 at the time at which the sensor data was collected corresponds to a flood prone location by searching or querying the database comprising flood prone locations and comparing the flood prone locations with the location of the vehicle apparatus to determine if the vehicle apparatus was within the specified range of a flood prone location. The specified range may be predefined.

If the computing entity 10, such as the processor 12, determines that the received location data does not correspond with a flood prone location, the computing entity 10 may terminate the process. However, if the computing entity 10, such as the processor 12, determines that the received location data corresponds with a flood prone location, the process may continue to block 305. As described above, the computing entity 10 may be configured to analyze the received location data to determine if the received location data corresponds with a flood prone location. In other embodiments, however the location data may be analyzed by the vehicle apparatus 20 and/or other computing entities and then transmitted to the computing entity 10 only after the location data has been determined to correspond with a flood prone location.

In an example embodiment, the vehicle apparatus 20, such as the processor 22, may be configured to determine, based on the current location of the vehicle, if the vehicle is within the specified range of a flood prone location (as identified by the computing entity 10 and provided to the vehicle apparatus). Alternatively, the computing entity 10, such as the processor 12, may be configured to monitor the location of a vehicle (based upon location data provided by the vehicle) and to determine if the vehicle is within the specified range of a flood prone location. When the vehicle is within the specified range of a flood prone location, data, such as sensor data, may be collected. For example, the computing entity 10 may include means, such as the processor 12, the communication interface 16 or the like, for activating one or more vehicle sensors 30 in order to trigger image or other sensor data collection. In some embodiments, the computing entity 10 may also or alternatively include means, such as the processor 12, the communication interface 16 or the like, for requesting data (e.g. images) already captured and stored by the vehicle apparatus 20 from a specific period of time and/or while within the specified range of a flood prone location.

In example embodiments, the data may also comprise vehicle identification information/data. For example, the data may indicate the type, make, model, trim package, year and/or the like of the vehicle associated with the vehicle apparatus 20, a sensor configuration associated with the vehicle apparatus 20, and/or the like. In some embodiments, the computing entity 10 may include means, such as the processor 12 or the like, for determining and assigning instructions that are adapted for a particular type, make, model, trim package, year and/or the like of vehicle or a particular type of sensor configuration associated with the vehicle apparatus 20, such as instructions that are tailored based upon the sensor(s) onboard a particular vehicle to increase the likelihood of obtaining data that is useful in relation to the determination of whether the flood prone location is actually experiencing a flood. In this regard, the instructions may be adapted or optimized for a particular vehicle type, make, model, trim package, year, and/or the like and/or a particular sensor configuration associated with the vehicle apparatus 20. In some embodiments, data may be requested from and transmitted by other remote computing devices, processors and the like. For example, images may be transmitted from a traffic camera located within the specified range of the flood prone location. The traffic camera may comprise means, such as a processor, communications interface, and/or the like, for transferring data to and receiving data from the computing entity 10.

At block 305, at least a portion of the data may be received and analyzed by the computing entity 10 to determine a flood confidence for the flood prone location based upon the data. For example, the computing entity 10 may be configured to receive and analyze sensor data from one or more vehicle apparatuses 20. For example, the computing entity 10 may comprise means, such as processor 12, communications interface 16, and/or the like, for receiving and analyzing the sensor data. For example, the processor may be configured to process the sensor data, such as by computer-executable instructions that indicate which sensor information/data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm.

In some embodiments, the computer-executable instructions may indicate that the sensor data may be analyzed differently based on the vehicle type, vehicle make/model, time of day, road segment (immediately) previously traversed, vehicle route (e.g., the order in which road segments are traversed), and/or the like. For example, the sensor arrangement of a particular type of vehicle or make/model may be known to capture higher quality sensor information/data of a particular type or that is particularly useful for a certain type of analysis. Thus, the processor 12 of an example embodiment may be instructed to analyze the sensor data collected by vehicles of the particular type or make/model differently so as to take advantage of the higher quality, such as by more greatly weighting the results of the analysis o the sensor data, and/or to perform the analysis upon the higher quality sensor data more often than the sensor data collected by other vehicles. Similarly, some sensors may perform better in daylight conditions, night time driving conditions, various other lighting conditions, and/or the like and, as a result, the processor of an example embodiment may be instructed to analyze and to afford greater weight to the sensor data collected by these sensors in an instance in which the conditions that provide for better sensor performance are satisfied.

As noted above, the data may be provided and/or transmitted by a vehicle apparatus 20, via, for example, the network 50. In example embodiments, the data may be analyzed by the computing entity 10, such as the processor 12, after at least a pre-determined number of messages containing data are received, after messages containing data have been received for at least a pre-determined amount of time, after a pre-determined time window for receiving messages containing data has expired, and/or the like. In example embodiments, the one or more messages containing data may be analyzed individually, in subsets (e.g., corresponding to a particular time of day, time of the week, type of vehicle, and/or the like), or as a whole.

In some embodiments, the vehicle apparatus 20, such as the processor 22, may be configured to provide data, e.g., sensor data and/or location data, in accordance with a reporting criteria. For example, the reporting criteria may cause the provision of a message containing data in certain situations, but not in other situations. For example, the reporting criteria may cause a message containing data to be provided by every car, every tenth car, every one hundredth car, or the like which receives the request from a computing entity 10, may cause a message containing data to be provided only during a particular time of day (e.g., during rush hour, during an even hour, and/or the like), and/or may cause a message containing data to be provided only if the result of the analysis of the sensor information/data satisfies a particular result, such as by being greater/less than a threshold result value. Thus, the computer-executable instructions corresponding with a particular flood prone location may cause the sensor information/data to be analyzed in a particular manner and may cause or prevent the reporting of the data or the result of the analysis of the data under certain circumstances.

In some embodiments, the computer-executable instructions are executed by the computing entity 10, such as the processor 12, to cause analysis of at least a portion of the data collected, captured, gathered, measured, and/or the like by the one or more sensors 30 as the vehicle traversed within the specified range of the flood prone location. For example, the vehicle apparatus 20, such as the processor 22, may be configured execute the computer-executable instructions to cause analysis of at least a portion of the sensor information/data prior to provision of the data and/or the results of the analysis to the computing entity 10. For example, the vehicle apparatus 20 may comprise means, such as the processor 22 and/or the like, for executing the computer-executable instructions to cause analysis of the at least a portion of the sensor information/data. For example, the referenced instructions, function(s), and/or algorithm(s); embedded instructions, function(s), and/or algorithm(s); and/or factory programmed instructions, function(s), and/or algorithm(s) may be executed to analyze at least a portion of the sensor information/data.

In some embodiments, the computing entity 10 includes means, such as the processor 12, the communication interface 16 or the like, for receiving portions of data (e.g. images) from one or more vehicle apparatuses 20. The computing entity 10 of an example embodiment may also include means, such as the processor 12, the memory 14 or the like, for storing the received images in an image repository/database with identifying information such as location, timestamp, and vehicle identification as illustrated in Table 2 below.

TABLE 2

| Flood prone location | Images | Timestamp | Latitude/ longitude | Vehicle id |
|---|---|---|---|---|
| Ashland and 16$^{th}$ street | Image 1 | Aug. 21, 2019: 5:44 pm | 41.859561, −87.666290 | V2468 |
| Ashland and 16$^{th}$ street | Image 2 | Aug. 21, 2019: 5:43 pm | 41.858543, −87.64663 | V24645 |
| Ashland and 16$^{th}$ street | Image 3 | Aug. 21, 2019: 4:46 pm | 41.858543, −87.64663 | V246742 |

The computing entity 10, such as the processor 12, may be configured to divide time into time intervals (epochs). For a given time interval, the computing entity 10, such as the processor 12, may be configured to search the image repository for images taken during the time interval at the flood prone location or within the specified range of the flood prone location. For example, the computing entity 10, such as the processor 12, may search the repository for images from Ashland and 16$^{th}$ street on Aug. 21, 2019 between 5:00 and 5:45 pm. For that criterion, the results would be images 1 and 2. The computing entity 10 of this example embodiment includes means, such as the processor 12, for analyzing the resulting images and classify each image. For example, the computing entity 10, such as the processor 12, may tag each image as "flooding", "no flooding" or "not sure" in accordance with the determination from the analysis. A plurality of images may be received (e.g., by the computing entity 10) and analyzed. Of the plurality of images that are received, the computing entity 10, such as the processor 12, may be configured to discard one or more images for failing to meet one or more conditions. For example, unclear images, images not indicating flooding or no flooding to an allowable degree of certainty, or insufficient data (e.g., less than 2 images from one vehicle) may be discarded.

The computing entity 10, such as the processor 12, may receive an image as input and output a determination as to whether the image contains evidence of flooding. The computing entity 10, such as the processor 12, may be configured to classify or tag the images, for example as indicating flooding, not indicating flooding or unsure. The computing entity 10, such as the processor 12, may be configured to classify or tag the images by assigning a certainty score to each image (for example, image 1—no flooding—98% certainty). Images below a set threshold of certainty may be discarded or a weight factor may be applied such that images classified above a given percentage of certainty are given more weight in the analysis.

The image analysis may be manual, e.g. the images may be presented to humans interfacing with the system who assign tags and/or scores to each image. Alternatively, the analysis may be pursuant to an automatic image analysis technique implemented by the processor 12. For example, a machine learning model utilizing computer vision algorithm(s) (e.g. convolutional neural network) may be utilized by the processor 12 to classify/tag the images. The computing entity 10, such as the processor 12, may be configured to compute a confidence interval (i.e., flood confidence) based on the images analyzed. For example, the computing entity 10, such as the processor 12, may be configured to discard the images tagged "not sure" and determine a flood confidence score based upon, such as by proportional to, a ratio of a number of images of the flood prone location that are identified to represent flooding at the flood prone location to a total number of images of the flood prone location. For example, the computing entity 10, such as the processor 12, may be configured to determine a flood confidence score in accordance with the following formula:

$$\text{Flood confidence score} = (\text{total number of images tagged "flood"}/\text{total number of images}) \times 100$$

The computing entity 10, such as the processor 12, may be configured to set other conditions as part of the analysis, for example, requiring a specified 'total number of images' to be analyzed or a certain number of unique sources and/or combinations of sources (e.g. two or more vehicles reporting or at least one vehicle and at least one third party news source) with these other conditions needing to be satisfied prior to determining the flood confidence score. The computing entity 10, such as the processor 12, may utilize other methodologies, conditions and formulas. If, at block 307, the computing entity 10, such as the processor 12, determines, based on the flood confidence, such as a flood confidence failing to satisfy a threshold flood confidence score, such as by being less than a threshold flood confidence score, that there is no active flood event, the process may terminate. However, if the computing entity 10, such as the processor 12, is configured to determine, based on the flood confidence, such as a flood confidence satisfying a threshold flood confidence score, such as by equaling or exceeding a threshold flood confidence score, that there is an active flood event, the process may continue to block 309.

At block 307, the computing entity 10, such as the processor 12, the memory 14 or the like, may be configured to set a threshold flood confidence score for activating a flood event warning. For example, the computing entity 10, such as the processor 12, may require a predefined flood confidence score, such as a flood confidence score of 75%, in order to activate the flood event warning for the flood prone location. In some embodiments, the computing entity 10, such as the processor 12, may be configured to maintain the flood event warning for a prescribed amount of time.

At block 309, if the computing entity 10, such as the processor 12, has determined that there is an active flood event at the flood prone location, the computing entity 10 includes means, such as the processor 12 or the like, for causing a flood event warning to be generated. The flood event warning may have any of various forms and, in one embodiment, may comprise a message transmitted to the vehicle apparatus(es) 20 or provided in conjunction with the navigation or mapping system. In some embodiments, the computing entity 10, such as the processor 12, may assign an indication, such as computer-executable instructions, to a flood prone location entry stored in the database. For example, the computing entity 10 may comprise means, such as processor 12 and/or the like, for assigning an indication, such as computer-executable instructions, to flood prone location entries stored in the database. An updated map may be provided or transmitted to the one or more vehicle apparatuses 20. For example, the computing entity 10 may comprise means, such as the processor 12, communications interface 16, and/or the like, for providing the updated map. For example, the updated map may be provided and/or transmitted to a plurality of vehicle apparatuses 20 via the network 50. Based upon the updated map and the indication associated with a flood prone location, a flood event warning may be presented to the driver of the vehicle, such as by the display associated with a navigation or mapping system, audibly via a vehicle entertainment system or the like. Once the computing entity 10 has provided the indication of an active flood event, the flood event warning may be presented to the vehicle and/or the driver of the vehicle in all instances. Alternatively, the flood event warning may only be presented to the vehicle and/or the driver of the vehicle in an instance in which the vehicle is proximate the flood prone location, such as within a predefined distance of the flood prone location, and/or in an instance in which the predefined route along which the vehicle is travelling passes within a predefined distance of the flood prone location.

In an alternative embodiment in which vehicle is an autonomous or semi-autonomous vehicle, the flood event warning may comprise a control signal that is transmitted to the one or more vehicle apparatuses 20. In this example embodiment, the computing entity 10, such as the processor 12, the communications interface 16 or the like, may be configured tor transmit the control signal to activate or deactivate autonomous driving to the one or more vehicle apparatuses 20. In some embodiments, the computing entity 10, such as the processor 12, the communications interface 16 or the like, may be configured to transmit for the control signal to cause the vehicle apparatus 20 to deactivate autonomous driving during an active flood event. Once the computing entity 10 has provided the indication of an active flood event to a vehicle subject to autonomous or semi-autonomous control, autonomous driving may be deactivated in all instances. Alternatively, autonomous driving may only be deactivated in an instance in which the vehicle is proximate the flood prone location, such as within a predefined distance of the flood prone location, and/or in an instance in which the predefined route along which the vehicle is travelling passes within a predefined distance of the flood prone location.

At block 311, the computing entity 10 includes means, such as the processor 12 or the like, for repeatedly, such as continuously, analyzing the data in order to determine whether to maintain or terminate the flood event warning by, for example, updating the status of the flood prone location from active to inactive in order to terminate the flood event warning. The computing entity 10, such as the processor 12, may be configured to terminate the flood event warning if, for example, the flood confidence score goes below a certain threshold for a prescribed amount of time or if no sensor data relating to the flood prone location is received for a period of time.

Vehicle Apparatus Operation

FIG. 4 provides a flowchart of operations performed by a vehicle apparatus 20 in communication with the computing entity 10. The vehicle apparatus 20 may be configured to transmit and/or receive information from the computing entity 10, such as by receiving instructions from the computing entity 10. The vehicle apparatus 20 may be configured to utilize or subscribe to a system or application (e.g., a mapping system, navigation system or weather alert system) provided by or otherwise supported by the computing entity 10. The example mapping system may comprise computer-executable instructions embedded therein. When the vehicle apparatus 20, on-board a vehicle, traverses within the specified range of a flood prone location (which may be stored in conjunction with the flood prone location in the database), computer-executable instructions embedded in the map may be executed to cause analysis of sensor information/data collected, captured, gathered, measured, and/or the like by the one or more sensors 30.

Starting at block 401, the vehicle apparatus 20 may include means, such as the processor 22, for initializing the mapping system or navigation system (e.g. a user may launch an application on a computing device comprising an interactive map). The interactive map, or portions thereof, may be received (e.g. from the computing entity which may, in some embodiments be remote from the vehicle apparatus 20) and stored by the vehicle apparatus 20, such as in memory 24. In some embodiments, the computing entity 10 may transmit instructions for updating a copy of the interactive map stored by the vehicle apparatus 20. The interactive map may comprise computer-executable instructions embedded therein. For example, the vehicle apparatus 20 may comprise means, such as processor 22, memory 24, communications interface 26, and/or the like, for receiving, storing and/or updating the interactive map.

In various embodiments, the vehicle apparatus 20 may be determined to be within a specified range of a flood prone location represented by one or more geographical points, lines or areas of the map. The vehicle apparatus 20 may be, for example, following a route or a predicted route that passes within the specified range of the flood prone location represented by one or more geographical points, lines or areas on the map.

At block 403, the vehicle apparatus 20, such as the processor 22, is configured to execute computer-executable instructions corresponding to a particular location or portion of the map. For example, the vehicle that is carrying the vehicle apparatus 20 may traverse, be traversing, or be about to traverse a road segment that passes within the specified range of a flood prone location. For example, the vehicle apparatus 20 may comprise means, such as processor 22, memory 24, and/or the like, for accessing and executing computer-executable instructions corresponding to the flood prone location. These instructions may cause the vehicle apparatus 20, such as the processor 22, the sensors 30, communication interface 26 or the like, to compile and transmit sensor/location data while proximate the flood prone location. For example, as the vehicle traverses the road segment that passes within the specified range of the flood prone location, the one or more sensors 30 may capture, collect, record, measure, and/or the like sensor information/data. The vehicle apparatus 20 may also comprise means, such as processor 22, communications interface 26, sensors 30, and/or the like, for transmitting sensor information/data. For example, the sensor data may comprise geolocation information/data, digital image information/data, LiDAR measurement information/data (e.g., distance and/or height information/data corresponding to an object on or on the side of the road segment corresponding to the particular link), time information/data, acceleration information/data, heading information/data, steering wheel reaction information/data, and/or the like. It should be understood that the sensors 30 may comprise various types of sensors configured for collecting, capturing, recording, measuring, and/or the like a variety of sensor information/data, as appropriate for the application.

Various vehicle types, makes/models, and/or the like may have different combinations of sensors and/or sensors of various qualities. For example, the sensors 30 of Vehicle A may comprise a LiDAR sensor and a camera that are better suited for detecting a roadside barrier than the sensors 30 of Vehicle B. Similarly, the camera arrangement of Vehicle B may be better at detecting road paint (e.g., lines, lanes, etc.). Thus, in some embodiments, the computer-readable instructions may include instructions for vehicles of the same type as Vehicle A to perform a first analysis of the sensor data in an effort to detect a roadside barrier and for vehicles of the same type as Vehicle B to perform a different analysis of the sensor data to detect road paint indicative of lines, lanes, etc.

In some embodiments, the computer-executable instructions may comprise a reference to a function repository stored in association with the map. For example, the function repository may be a reference table, a serialized file, a database, and/or the like. In example embodiments, the computer-executable instructions may comprise a reference to a function repository stored in the association with the map and one or more coefficients or parameters that are to be used in the calculation or determination of the result of the referenced instructions, function(s), or algorithm(s). In such an embodiment, at block 405, the referenced instructions, function(s), and/or algorithm(s) may be retrieved and/or accessed from the function repository. For example, the vehicle apparatus 20 may be configured to retrieve and/or access instructions, function(s), and/or algorithm(s) referenced by the computer-executable instructions embedded in the map, from the function repository. For example, the vehicle apparatus 20 may comprise means, such as processor 22, memory 24, and/or the like, for retrieving and/or accessing instructions, function(s), and/or algorithm(s) referenced by the computer-executable instructions, such as the instructions embedded in the map, e.g., a link data record of the map, from the function repository. In some embodiments, the function repository may comprise different instructions based on different road design rules for different countries or geographical or political regions and/or the conventions thereof. In further embodiments, the function repository may consist of different instructions based on the type of vehicle being driven, the time of day, current velocity, and/or the like.

In some example embodiments, the vehicle apparatus 20 may comprise factory programmed instructions, function(s), algorithm(s), and/or the like (e.g., stored in memory 24) that may be defined for global usage (e.g., not defined to be unique with respect to a particular road segment or link) and the embedded computer-executable instructions may comprise one or more coefficients or parameters that are to be used in the calculation or determination of the result of the factory programmed instructions, function(s), or algorithm(s). For example, the factory programmed instructions, function(s), or algorithm(s) may comprise use of sensor information/data collected, captured, gathered, measured, and/or the like by a first sensor of the one or more sensors 30. The embedded computer-executable instructions may cause the vehicle apparatus 20, such as the processor 22, to analyze the sensor information/data differently along a respective portion of the map than is provided for by the factory programmed instructions, function(s), or algorithm(s).

At block 405, the vehicle apparatus 20 may be configured to transmit a response that includes or is otherwise based on the sensor data. The computer-executable instructions may be executed by the processor 22 to cause analysis of at least a portion of the sensor information/data collected, captured, gathered, measured, and/or the like by the one or more sensors 30 as the vehicle traversed the road segment that passes within a specified range of a flood prone location and transmission of a response. A response may be transmitted via the network 50, such as to the computing entity 10. For example, the vehicle apparatus 20 may comprise means, such as the processor 22, communications interface 26, and/or the like, for providing a response including, in some embodiments, the sensor data and location data indicating the location at which the sensor data was collection (and, in some instances) a time stamp indicating the time at which the sensor data was collected. In example embodiments, the computing entity 10 may be configured to receive the response from the vehicle apparatus 20. In example embodiments, a response may comprise the sensor data and/or an indication of a result of the analysis of sensor information/data that was caused by execution of the computer-executable instructions embedded in the map corresponding to the particular portion of the map (e.g. flood prone location). For example, execution of the computer-executable instructions by the processor 22 may cause the vehicle apparatus 20 to use, for example, vehicle cameras to capture and transmit images to the computing entity 10.

Additionally, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the computing entity 10, such as the processor 12 may determine and execute computer-executable instructions that are adapted to analyze the sensor data in a manner that is tailored for a particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular portions of the map may be adapted or optimized for a particular vehicle type, make, model, trim package, year, and/or the like and/or a particular sensor configuration associated with the vehicle apparatus 20.

In various embodiments, a response may comprise various other information/data associated with the vehicle; vehicle apparatus 20; the result of the analysis caused by the execution of the computer-executable instructions; the result of the analysis caused by factory programmed instructions, functions, or algorithms; and/or the like, as appropriate for the application.

At block 407, the vehicle apparatus 20 may include means, such as the processor 22, the communications interface 26 or the like, for receiving an indication, such as a flood event warning, of an active flood event from the computing entity 10. In an example embodiment, the indication may comprise an update to the interactive map/mapping system, a warning message/alert and/or the like. Based upon the indication including, for example, an updated map, associated with a flood prone location, a flood event warning may be presented to the driver of the vehicle, such as by the display associated with a navigation or mapping system, audibly via a vehicle entertainment system or the like. Once the vehicle apparatus 20 has received the indication of an active flood event, the flood event warning may be presented to the vehicle and/or the driver of the vehicle in all instances. Alternatively, the flood event warning may only be presented to the vehicle and/or the driver of the vehicle in an instance in which the vehicle is proximate the flood prone location, such as within a predefined distance of the flood prone location, and/or in an instance in which the predefined route along which the vehicle is travelling passes within a predefined distance of the flood prone location.

In another example embodiment in which the vehicle is driven autonomously or semi-autonomously, the indication received by the vehicle apparatus 20 may be a control signal that serves to activate or deactivate autonomous driving by vehicle. For example, the computing entity 10, such as the processor 12, the communication interface 16 or the like, may be configured to transmit instructions, such as a control signal, causing the vehicle apparatus 20 to deactivate autonomous driving during an active flood event. Once the vehicle apparatus 20 of a vehicle subject to autonomous or semi-autonomous control has received the indication of an active flood event, autonomous driving may be deactivated in all instances. Alternatively, autonomous driving may only be deactivated in an instance in which the vehicle is proximate the flood prone location, such as within a predefined distance of the flood prone location, and/or in an instance in which the predefined route along which the vehicle is travelling passes within a predefined distance of the flood prone location.

III. Example Apparatus

The vehicle apparatus 20 and/or computing entity 10 of an example embodiment may be embodied by or associated with a variety of computing devices. The vehicle apparatus 20 may be embodied, for example, by a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. The computing entity 10 may be embodied in other types of computing devices, such as a server, a personal computer, a computer workstation, a laptop computer, a plurality of networked computing devices or the like, that are configured to identify flood prone locations and to provide an indication in an instance in which a vehicle is near a flood prone location or has a route that extends through a flood prone location.

In this regard, FIG. 2A depicts an computing entity 10 and FIG. 2B depicts a vehicle apparatus 20 of an example embodiment that may be embodied by various computing devices including those identified above. As shown, the computing entity 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus to determine one or more features of the corresponding vehicle's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the computing entity 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The computing entity 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the computing entity 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the computing entity 10 may be configured to modify, update, and/or the like one or more data records of the geographic database.

In an example embodiment, the data records represent and comprise road networks, roads, streets, paths and the like, such as used by vehicles, cars, and/or other entities. The roads, streets, and the like may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the computing entity 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for generating a flood event warning for a flood prone location, the method comprising:
   identifying, by a server, a location in a database as the flood prone location, wherein the location is identified as the flood prone location based at least on historical data;
   receiving data comprising at least location and sensor data associated with the flood prone location from one or more remote devices, wherein the data comprises images received from image capturing apparatuses of the one or more remote devices;
   storing the images received from the image capturing apparatuses of the one or more remote devices according to predefined time intervals in an image repository;
   searching the image repository for images taken during a particular time interval at the flood prone location;
   identifying flood conditions within at least a portion of the images received by analyzing the images within the image repository for the particular time interval to determine a number of images within the particular time interval that include the flood conditions;
   determining a flood confidence of the flood conditions for the flood prone location based upon the data, wherein the flood confidence of the flood conditions is established based on a number of images in which the flood conditions are identified during the particular time interval relative to a total number of images received during the particular time interval less a number of images received during the particular time interval where the flood conditions are indeterminate;
   identifying an active flood event for the flood prone location based upon the flood confidence; and
   causing the flood event warning to be activated in an instance in which the active flood event is identified.

2. The method of claim 1, further comprising deactivating the flood event warning in an instance in which no active flood event is identified.

3. The method of claim 1, wherein identifying the flood prone location further comprises designating a location stored in the database as the flood prone location.

4. The method of claim 1, wherein identifying the active flood event comprises analyzing the images pursuant to an automatic image analysis technique, wherein the automatic image analysis technique determines a flood condition, an absence of a flood condition, or an unknown flood condition.

5. The method of claim 4, further comprising:
   triggering the image capturing apparatuses of the one or more remote devices to capture images of the flood prone location when the one or more remote devices are within a specified range of the flood prone location.

6. The method of claim 1, wherein causing the flood event warning to be activated comprises causing the flood event warning to be transmitted to the one or more remote devices for display in conjunction with a mapping or navigation system.

7. The method of claim 6, wherein the one or more remote devices comprise one or more vehicles, and wherein activating the flood event warning comprises causing a control signal to be transmitted to the one or more vehicles in order to deactivate autonomous driving of the one or more vehicles.

8. An apparatus configured to activate a flood event warning for a flood prone location, the apparatus comprising processing circuitry and at least one memory including computer program code instructions, the computer program code instructions configured to, when executed by the processing circuitry, cause the apparatus to:
   identify a location in a database as the flood prone location, wherein the location is identified as the flood prone location based at least on historical data;
   receive data comprising at least location and sensor data associated with the flood prone location from one or more remote devices, wherein the data comprises images received from image capturing apparatuses of the one or more remote devices;
   store the images received from the image capturing apparatuses of the one or more remote devices according to predefined time intervals in an image repository;
   search the image repository for images taken during a particular time interval at the flood prone location;
   identify flood conditions within at least a portion of the images received by analyzing the images within the image repository for the particular time interval to determine a number of images within the particular time interval that include the flood conditions;
   determine a flood confidence of the flood conditions for the flood prone location based upon the data, wherein the flood confidence of the flood conditions is established based on a number of images in which the flood conditions are identified during the particular time interval relative to a total number of images received during the particular time interval less a number of images received during the particular time interval where the flood conditions are indeterminate;
   identify an active flood event for the flood prone location based upon the flood confidence; and
   cause the flood event warning to be activated in an instance in which the active flood event is identified.

9. The apparatus according to claim 8, wherein the computer program code instructions are further configured to, when executed by the processing circuitry, cause the apparatus to deactivate the flood event warning in an instance in which no active flood event is identified.

10. The apparatus according to claim 8, wherein the computer program code instructions are further configured to, when executed by the processing circuitry, cause the apparatus to identify the flood prone location by designating a location stored in the database as the flood prone location.

11. The apparatus according to claim 8, wherein identifying the active flood event comprises analyzing the images pursuant to an automatic image analysis technique, wherein the automatic image analysis technique determines a flood condition, an absence of a flood condition, or an unknown flood condition.

12. The apparatus according to claim 11, wherein the computer program code instructions are further configured to, when executed by the processing circuitry, cause the apparatus to trigger the image capturing apparatuses of the one or more remote devices to capture images of the flood prone location when the one or more remote devices are within a specified range of the flood prone location.

13. The apparatus according to claim 8, wherein the computer program code instructions are further configured to, when executed by the processing circuitry, cause the apparatus to cause the flood event warning to be activated by causing the flood event warning to be transmitted to the one or more remote devices for display in conjunction with a mapping or navigation system.

14. The apparatus according to claim 13, wherein the one or more remote devices comprise one or more vehicles, and wherein the computer program code instructions are further configured to, when executed by the processing circuitry, cause the apparatus to cause the flood event warning to be activated by causing a control signal to be transmitted to the one or more vehicles in order to deactivate autonomous driving of the one or more vehicles.

15. A computer program product configured to activate a flood event warning for a flood prone location, the computer program product comprising at least one non-transitory computer-readable storage medium having computer-executable program code instructions therein, the computer-executable program code instructions comprising program code instructions configured, upon execution, to:
   identify a location in a database as the flood prone location, wherein the location is identified as the flood prone location based at least on historical data;
   receive data comprising at least location and sensor data associated with the flood prone location from one or more remote devices, wherein the data comprises images received from image capturing apparatuses of the one or more remote devices;
   store the images received from the image capturing apparatuses of the one or more remote devices according to predefined time intervals in an image repository;
   search the image repository for images taken during a particular time interval at the flood prone location;
   identify flood conditions within at least a portion of the images received by analyzing the images within the image repository for the particular time interval to determine a number of images within the particular time interval that include the flood conditions;
   determine a flood confidence of the flood conditions for the flood prone location based upon the data, wherein the flood confidence of the flood conditions is established based on a number of images in which the flood conditions are identified during the particular time interval relative to a total number of images received during the particular time interval less a number of images received during the particular time interval where the flood conditions are indeterminate;
   identify an active flood event for the flood prone location based upon the flood confidence; and
   cause the flood event warning to be activated in an instance in which the active flood event is identified.

16. The computer program product according to claim 15, wherein the computer-executable program code instructions further comprise program code instructions configured, upon execution, to deactivate the flood event warning in an instance in which no active flood event is identified.

17. The computer program product according to claim 15, wherein the computer-executable program code instructions further comprise program code instructions configured, upon execution, to identify the flood prone location by designating a location stored in the database as the flood prone location.

18. The computer program product according to claim 15, wherein identifying the active flood event comprises analyzing the images pursuant to an automatic image analysis technique, wherein the automatic image analysis technique determines a flood condition, an absence of a flood condition, or an unknown flood condition.

19. The computer program product according to claim 18, wherein the computer-executable program code instructions further comprise program code instructions configured, upon execution, to trigger the image capturing apparatuses of the one or more remote devices to capture images of the flood prone location when the one or more remote devices are within a specified range of the flood prone location.

20. The computer program product according to claim 15, wherein the computer-executable program code instructions further comprise program code instructions configured, upon execution, to cause the flood event warning to be activated by causing the flood event warning to be transmitted to the one or more remote devices for display in conjunction with a mapping or navigation system.

21. The computer program product according to claim 20, wherein the one or more remote devices comprise one or more vehicles, wherein the computer-executable program code instructions further comprise program code instructions configured, upon execution, to cause the flood event warning to be activated by causing a control signal to be transmitted to the one or more vehicles within a range of the flood prone location in order to deactivate autonomous driving of the one or more vehicles.

* * * * *